(12) United States Patent
Bencar et al.

(10) Patent No.: US 10,418,008 B2
(45) Date of Patent: *Sep. 17, 2019

(54) CYBER REALITY DEVICE INCLUDING GAMING BASED ON A PLURALITY OF MUSICAL PROGRAMS

(71) Applicant: Beamz Interactive, Inc., Albuquerque, NM (US)

(72) Inventors: Gary Bencar, Haiku, HI (US); Gerald Henry Riopelle, Scottsdale, AZ (US); Todd Nystrom, Renton, WA (US)

(73) Assignee: Beamz IP, LLC, Scottsdale, AZ (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/483,910

(22) Filed: Apr. 10, 2017

(65) Prior Publication Data

US 2018/0025710 A1     Jan. 25, 2018

Related U.S. Application Data

(63) Continuation-in-part of application No. 15/402,012, filed on Jan. 9, 2017, now Pat. No. 9,646,588, which
(Continued)

(51) Int. Cl.
*A63F 13/537* (2014.01)
*G10H 1/00* (2006.01)
(Continued)

(52) U.S. Cl.
CPC ......... *G10H 1/0008* (2013.01); *A63F 13/537* (2014.09); *A63F 13/814* (2014.09);
(Continued)

(58) Field of Classification Search
CPC ............... G10H 1/0008; G10H 1/0025; G10H 2210/105; G10H 2210/125; G10H 2210/096; G10H 2210/106; G10H 2210/111; G10H 2210/126; G10H 2210/135; G10H 2210/201;
(Continued)

(56) References Cited

U.S. PATENT DOCUMENTS 7,758,427 B2 * 7/2010 Egozy ..................... A63F 13/12
463/42
8,550,908 B2 * 10/2013 Booth ..................... A63F 13/10
463/30

(Continued)

*Primary Examiner* — Corbett B Coburn
(74) *Attorney, Agent, or Firm* — Culhane Meadows PLLC; Robert C. Klinger

(57) ABSTRACT

A system enabling the performance of sensory stimulating content including music and video using gaming in a cyber reality environment, such as using a virtual reality headset. This disclosure includes a system and method through which a performer can virtually trigger and control a presentation of pre-packaged sensory stimulating content including musical programs through gaming. A theme for the performer is that the pre-packaged sensory stimulating content is preferably chosen such that, even where the performer is a novice, the sensory stimulating data is presented in a pleasing and sympathetic manner and scoring is provided as a function of the performer's ability to provide a gesture in association with a displayed virtual trigger.

20 Claims, 6 Drawing Sheets

US 10,418,008 B2
Page 2

Related U.S. Application Data is a continuation of application No. 15/215,427, filed on Jul. 20, 2016, now Pat. No. 9,542,919.

(51) Int. Cl.
*A63F 13/814* (2014.01)
*G06F 3/01* (2006.01)
*G02B 27/01* (2006.01)

(52) U.S. Cl.
CPC ............ G02B 27/017 (2013.01); G06F 3/011 (2013.01); G10H 1/0025 (2013.01); *G10H 2210/105* (2013.01); *G10H 2210/125* (2013.01); *G10H 2220/096* (2013.01); *G10H 2220/106* (2013.01); *G10H 2220/111* (2013.01); *G10H 2220/126* (2013.01); *G10H 2220/135* (2013.01); *G10H 2220/201* (2013.01); *G10H 2220/401* (2013.01); *G10H 2220/415* (2013.01); *G10H 2240/131* (2013.01)

(58) Field of Classification Search
CPC ....... G10H 2210/401; G10H 2210/415; G10H 2240/131; A63F 13/537; A63F 13/814; G06F 3/011; G02B 27/017
See application file for complete search history.

(56) References Cited

U.S. PATENT DOCUMENTS

| | | | | |
|---|---|---|---|---|
| 8,629,342 B2 * | 1/2014 | Lee | ........................ | G09B 15/00 84/477 R |
| 8,895,830 B1 * | 11/2014 | Sharifi | .................... | A63F 13/65 381/56 |
| 9,542,919 B1 * | 1/2017 | Bencar | .................. | G10H 1/0025 |
| 9,646,588 B1 * | 5/2017 | Bencar | .................. | G10H 1/0025 |
| 2008/0200224 A1 * | 8/2008 | Parks | ..................... | G10H 1/368 463/7 |
| 2008/0311970 A1 * | 12/2008 | Kay | ........................ | A63F 13/10 463/7 |
| 2009/0310027 A1 * | 12/2009 | Fleming | ............. | H04N 21/2368 348/706 |
| 2010/0009750 A1 * | 1/2010 | Egozy | ................... | A63F 13/005 463/35 |
| 2010/0029386 A1 * | 2/2010 | Pitsch | ..................... | A63F 13/12 463/35 |
| 2010/0087240 A1 * | 4/2010 | Egozy | ................. | G10H 1/0016 463/7 |
| 2010/0137048 A1 * | 6/2010 | Kim | ..................... | G09B 15/003 463/7 |
| 2010/0184497 A1 * | 7/2010 | Cichowlas | .............. | A63F 13/00 463/7 |
| 2010/0257993 A1 * | 10/2010 | Brow | ..................... | G09B 15/02 84/478 |
| 2011/0077080 A1 * | 3/2011 | Meer | ....................... | A63F 13/44 463/32 |
| 2011/0086704 A1 * | 4/2011 | Davis | ..................... | A63F 13/46 463/31 |
| 2011/0207513 A1 * | 8/2011 | Cross | .................... | G10H 1/368 463/7 |
| 2016/0343362 A1 * | 11/2016 | Brosius | ................ | G10H 1/0016 |
| 2016/0367902 A1 * | 12/2016 | Guinchard | ............. | A63F 13/73 |
| 2017/0185141 A1 * | 6/2017 | Shotton | ................... | G06F 3/011 |
| 2018/0126268 A1 * | 5/2018 | Santos | ................. | A63F 13/428 |

* cited by examiner

CYBER REALITY DEVICE INCLUDING GAMING BASED ON A PLURALITY OF MUSICAL PROGRAMS

CLAIM OF PRIORITY

This application is a continuation-in-part (CIP) of co-pending U.S. patent application Ser. No. 15/402,012 filed Jan. 9, 2017 entitled Cyber Reality Musical Instrument and Device, which is a continuation of U.S. patent application Ser. No. 15/215,427 filed Jul. 20, 2016 entitled Cyber Reality Musical Instrument and Device, the teachings of which are included herein in their entirety.

TECHNICAL FIELD

The present disclosure relates to the composition and performance of sound and video content in a cyber reality environment, including gaming.

SUMMARY

This disclosure relates to the performance of sensory stimulating content including music and video using gaming in a cyber reality environment, such as using a virtual reality headset. This disclosure includes a system and method through which a performer can virtually trigger and control a presentation of pre-packaged sensory stimulating content including musical programs through gaming. A theme for the performer is that the pre-packaged sensory stimulating content is preferably chosen such that, even where the performer is a novice, the sensory stimulating data is presented in a pleasing and sympathetic manner and scoring is provided as a function of the performer's ability to provide a gesture in association with a displayed virtual trigger.

BRIEF DESCRIPTION OF THE DRAWINGS

The accompanying drawings, which are included to provide a further understanding of the invention and are incorporated in and constitute a part of this specification, illustrate embodiments of the disclosure and together with the description serve to explain the principles of the disclosure.

Cyber reality is defined as the collection of virtual reality, technology assisted reality, and augmented reality that does not require the performer to physically touch the trigger in order to activate the trigger. Gestures of a user are detected in association with the virtual trigger to cause a triggering event.

This disclosure enables anyone to interactively play musical instruments and notes while at the same time enjoying the competition of a traditional music rhythm timing game and/or a range of potential music games.

This disclosure enables players to actually play the notes as the user is visually compelled to time their strikes with an array of moving trigger activation objects.

A musical underscore may accompany the trigger activation objects to reinforce the musical timing, but the triggered notes do not exist in the music underscore. They are layered on top of the ongoing musical underscore and only sound if the player triggers them during the prescribed timing window (the "Trigger Zone"). The player can see the note "opportunity" approaching (in the form of a trigger activator object such as a large drop, a ball, etc.), and as the object collides with the "Trigger Zone" the virtual trigger becomes enabled and the player has a brief opportunity to trigger the note. If the player strikes within the "Trigger Zone", then the note sounds. If the player does not strike at the appropriate time, or strikes before or after the "Trigger Zone", then the note will not sound. Based on the player's skill, they can achieve different increasingly difficult levels of play.

The player can also enter Freestyle Play at any time, which allows the player to trigger any of the instruments at will, creating new melodies and riffs without the boundary of the "Trigger Zone"—free to just jam and create their own music composition. The game includes an optional scoring algorithm for Free Play, allowing users to compete here as well.

Figure 1:
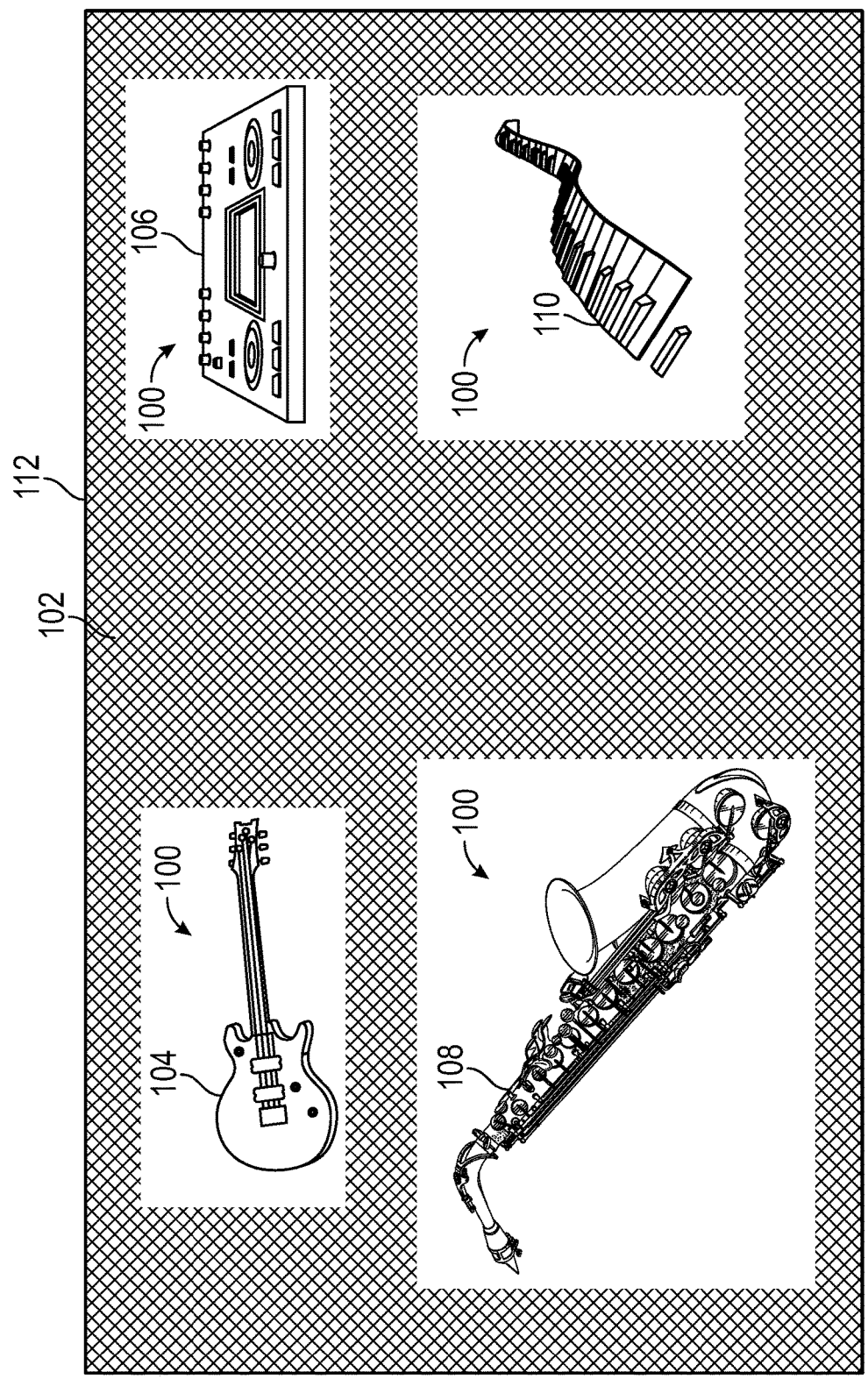
FIG. 1 illustrates virtual (foreground) triggers.

FIG. 1 illustrates four virtual triggers 100 in a Foreground cyber environment. The virtual triggers 100 are shown on top of an empty Background environment 102. The illustrated virtual triggers 100 are Guitar 104, DJ Deck 106, Saxophone 108, and Keyboard instrument 110, although these virtual triggers could be any other form, such as a laser beam or other item without an instrument ICON. The virtual triggers 100 are spatial and "float" in front of the Background environment 102 collectively forming a cyber environment 112.

The virtual triggers 100 appear in the cyber reality space in front of the user who interacts with them by physically reaching out to where the virtual triggers 100 are perceived to be within a cyber reality display 505 (see FIG. 5), such as a virtual reality headset, and touching them in a prescribed way with hands, a physical object such as a conductor's baton, or a hand-held controller.

There can be any number of virtual triggers 100, and the virtual triggers 100 can be placed anywhere in the cyber environment 112, directly in front, off to the side, on top, or behind the user, requiring the user to look to the side or up or back to see them.

Figure 5:
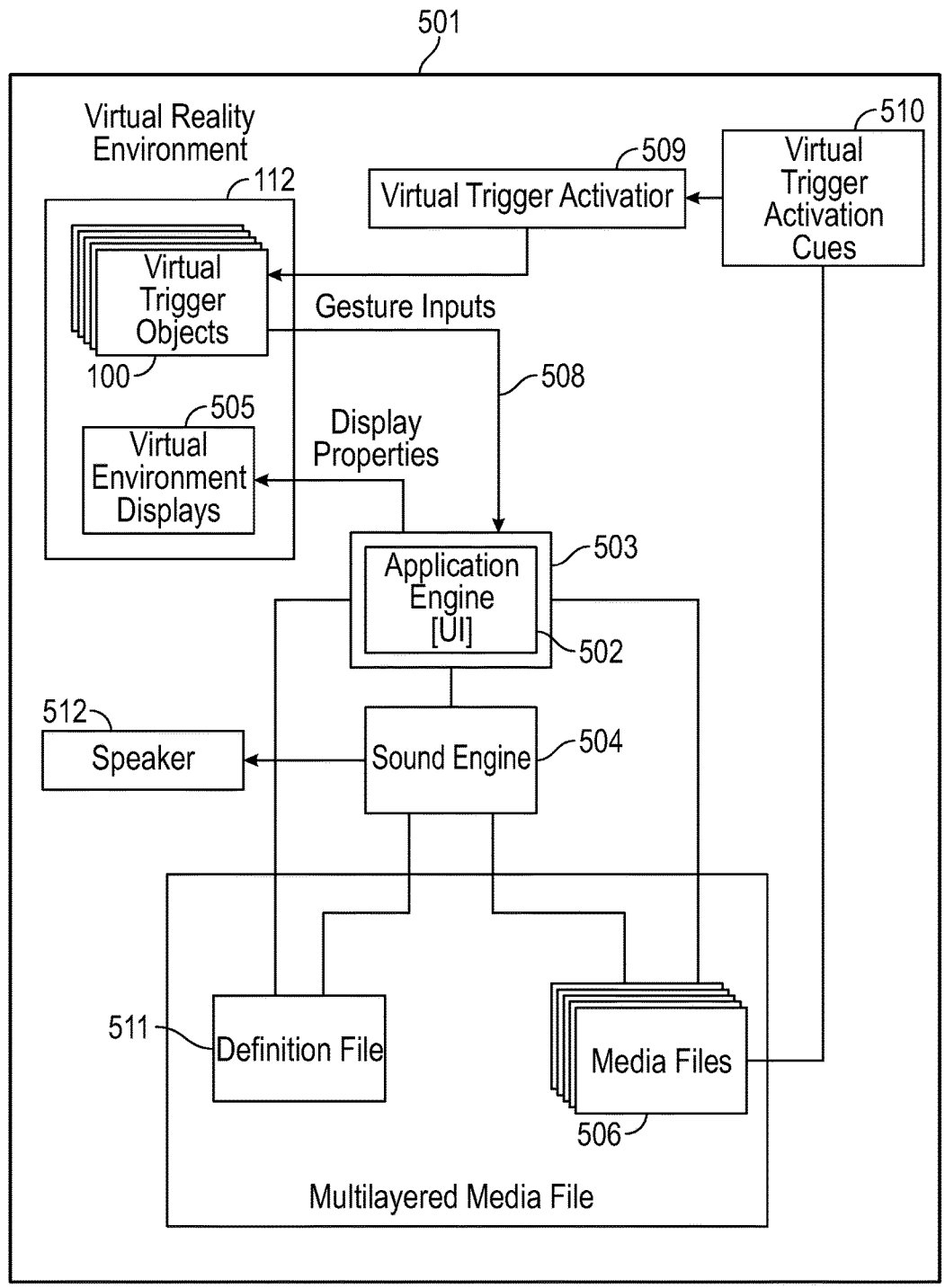
FIG. 5 illustrates a diagram of a system for multilayered media playback in Cyber Reality gaming.

The virtual trigger 100 can be any Cyber Reality object or element that indicates when a user interacts with it. These interactive Cyber Reality objects/elements send standard gestures or notifications to an Application Engine 502, as shown in FIG. 5, when the user interacts with them in a prescribed way. The Application Engine 502 sends a Trigger-ON notification to a sound engine 504 when a gesture is received from a virtual trigger 100, and a corresponding Trigger-OFF is sent when the gesture ends.

Interactive virtual triggers 100 are configured to manipulate the Foreground environment to provide visual feedback on display 505 when they are triggered, such as, but not limited to, highlighting or altering the trigger imagery in some way, or by introducing additional graphic objects into the Foreground. Such trigger-specific manipulations cause the cyber reality Foreground to be dynamically linked to music programs that are being interactively triggered. Each time the performer activates a virtual trigger 100, such as by gesturing, a corresponding signal is then sent to an application engine 502 as will be described shortly, and causes the presentation of content associated with the activated virtual trigger 100. Two or more activated virtual triggers 100 create a composition, including but not limited to sympathetic music whereby each virtual trigger 100 is associated with a music program stored in a media file 506, and the music programs are synchronized when the music programs are played. Each music program may comprise a sub-part of a composition, such as a subset of a song where each subset corresponds to a particular instrument's portion of the composition. These music programs can consist of, for example, one or more MIDI files, samples such as .wav and .mp3 files, etc.

Figure 2:
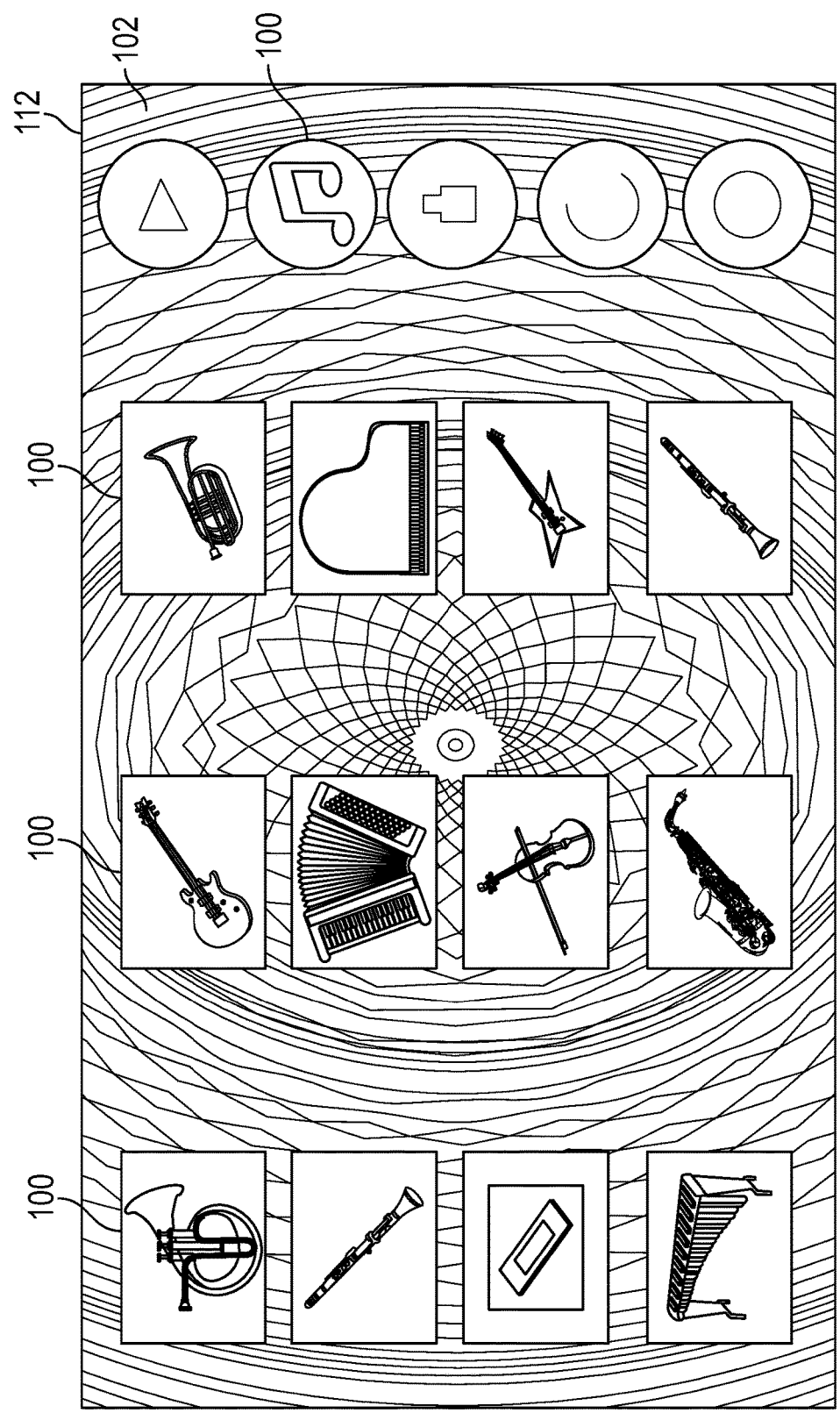
FIG. 2 illustrates multiple virtual triggers on top of a music-linked interactive background environment.

FIG. 2 illustrates a possible embodiment of a cyber environment 112 where the virtual triggers 100 are arranged to present a wall of music instrument icons in front of the user within the cyber environment 112, as viewed on display 505. The virtual triggers 100 appear in front of background environment 102 consisting of an interactive kaleidoscope that is being controlled by the virtual (music program) triggers 100.

The virtual triggers 100 are configured to manipulate the background cyber environment 102 when they are triggered, such as, but not limited to, modifying the color properties of specific elements in the display 505 or changing the imagery entirely.

On an individual basis, each virtual trigger 100, or the sound produced by the virtual trigger 100, controls or adjusts a unique color component for the display 505. The brightness of the color could optionally be linked to the volume level of the sound being produced by the virtual trigger 100.

In addition, each virtual trigger 100 can increase or decrease the value of a property used to generate the kaleidoscopic design itself (Number of petals, Number of orbits, Radial suction, & Scale factor). The amount of adjustment can be linked to the volume level of the sound being interactively produced by the virtual triggers 100.

The same concept can be applied to simulated multi-colored laser displays that draw geometric patterns in the cyber reality background, where the color attributes or geometric rendering properties are manipulated interactively by the virtual triggers 100 and/or the sounds that are interactively produced by the virtual triggers 100.

Such trigger-specific manipulations cause the cyber reality background 102 to be dynamically linked to the music programs that are being interactively triggered.

Figure 3:
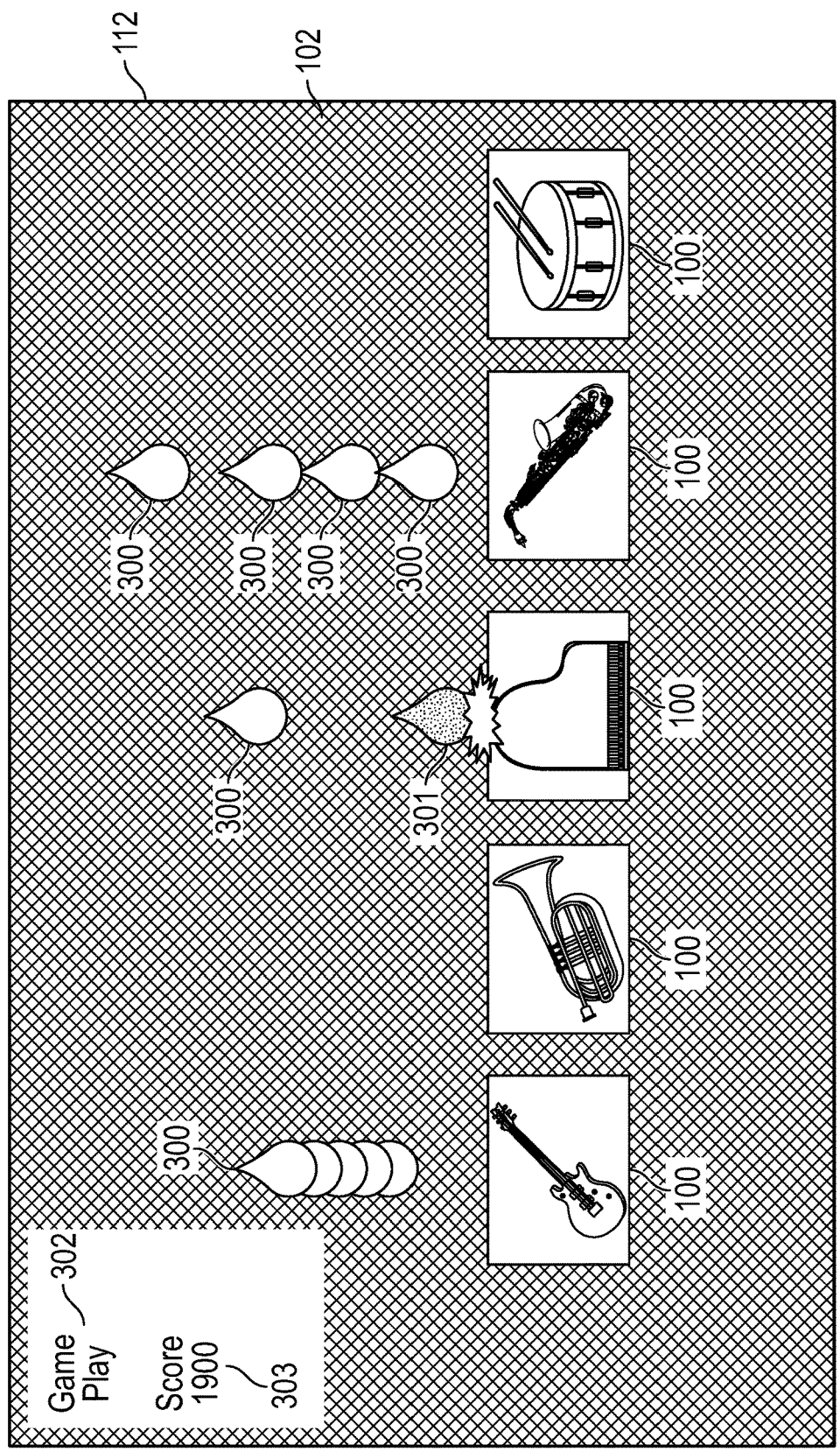
FIG. 3 illustrates a possible user's perspective of the frontal view during game play mode.

FIG. 3 shows an embodiment for a Game Play mode of the cyber environment 112, as viewed on display 505, where five virtual triggers 100 are normally disabled and require interaction from animated virtual trigger activators 300, which are being shown in this example as droplets.

When an animated virtual trigger activator 300 has a collision 301 with a virtual trigger object 100, the associated virtual trigger 100 becomes active and enabled for a predetermined time period, and then the associated virtual trigger 100 returns to a disabled state. This illustration shows an embodiment where the trigger activator 300 changes color when it collides with the associated virtual trigger 100. In other embodiments, the trigger activator 300 could also be highlighted during a collision.

While a virtual trigger 100 is active, it can change color or be highlighted in some way as to indicate its active state.

Figure 4:
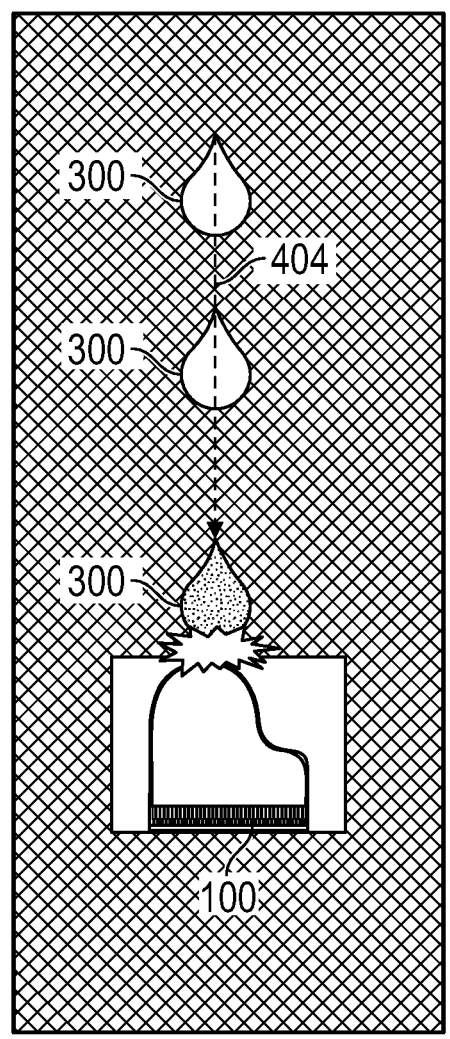
FIG. 4 illustrates trigger activator objects and how they are used to activate virtual trigger objects.

FIG. 4 illustrates virtual trigger activation with animated drops 300 as trigger activators.

When a signal is received from a virtual trigger activator 509 (see FIG. 5), a teardrop shaped trigger activation object 300 is instantiated directly above a virtual trigger 100 where it begins traveling down a path 404 towards the virtual trigger object 100.

When the trigger activation object 300 collides at 301 with the virtual trigger 100, the virtual trigger 100 is activated for a predetermined time window, after which, it will become inactive again. Virtual triggers 100 are highlighted while they are active. The predetermined time window can be selectively controlled by application engine 502, and may be, for instance, 0.5 seconds.

The trigger activation object 300 can change color or be highlighted when it collides at 301 with the virtual trigger object 100 during this predetermined time window.

If the user interacts with the virtual trigger 100 while it is highlighted and active, an appropriate gesture input 508 will be sent to the application engine 502, and a sound file assigned to the virtual trigger 100 will be played and heard via speaker 512. If the user interacts with a virtual trigger 100 while it is inactive, nothing will be sent to the application engine 502 and no sound is produced at speaker 512.

Figure 6:
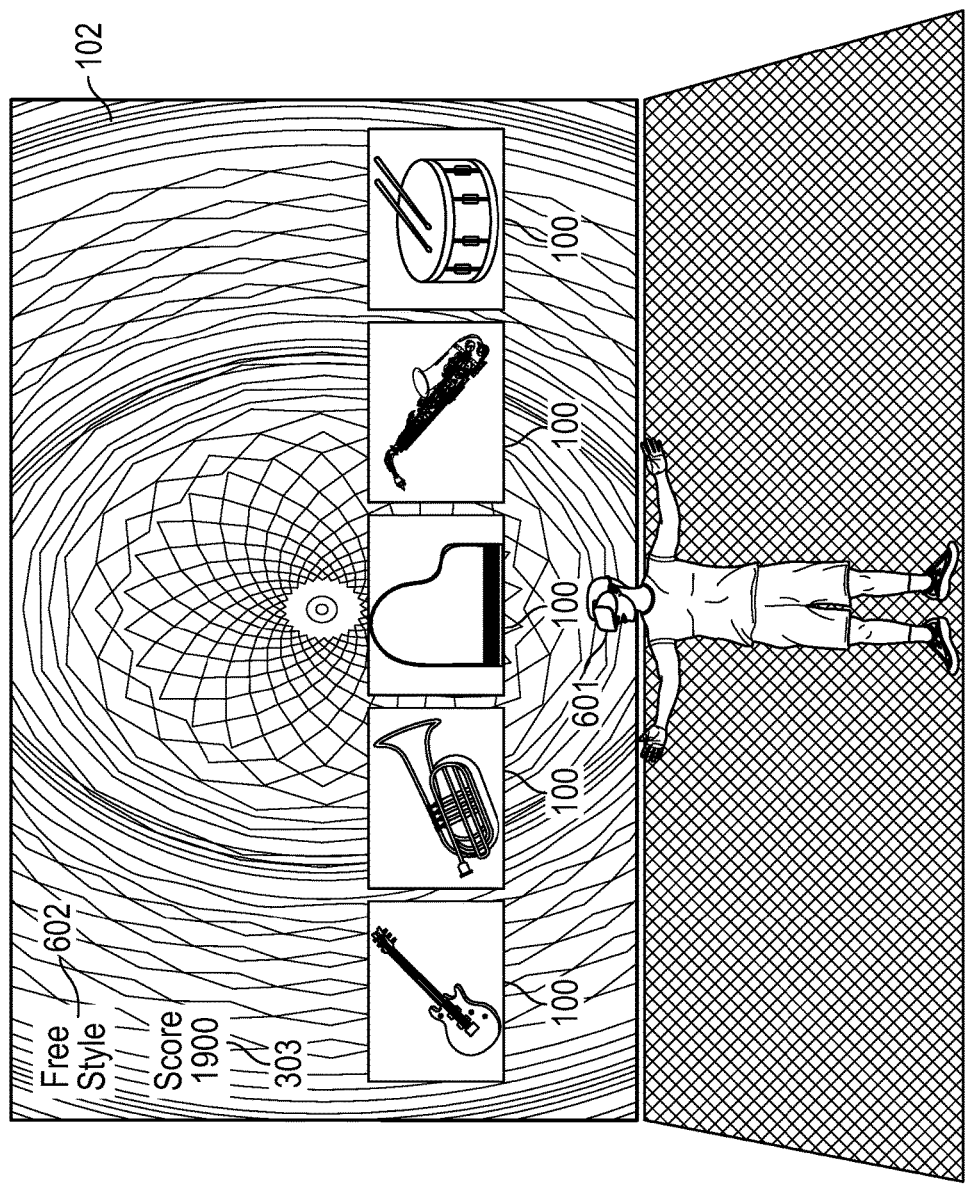
FIG. 6 illustrates a possible embodiment for free style mode, where the virtual triggers are always enabled and active.

Game scoring has two different methods depending on the current mode of play: Game Play mode 302 (FIG. 4) and Free Style mode 602 (FIG. 6).

Both modes start with a displayed score 303 having a value of zero (0) when the application is launched and the score value is dynamically adjusted as described when the application is running.

In Game Play mode 302, if the user interacts with the virtual trigger object 100 while it is highlighted and active, a sound is played on speaker 512, and a predetermined value is added to the current score 303, such as a value of 100. If the user does not interact with a virtual trigger 100 while it is active or interacts with it while it is inactive, no sound is played on speaker 512, nothing is added to the displayed score 303, and, in some embodiments, a predetermined value may optionally be deducted from the score 303, such as 25 points.

In the Free Style mode 602, the virtual triggers 100 are always active and will always produce sound whenever the user interacts with them. Scoring in Free Style mode has its own methods and is optional as a user selection.

If selected, Free Style scoring can be based on the musical timing of virtual trigger 100 gestures in relationship with the musical underscore as defined by its tempo, time signature, and its current metronome value as determined by the application engine 502. When a gesture 508 is sent to the application engine 502 that is musically "in time" with the musical underscore, a predetermined value can be added to the current score 303, such as 100. Conversely, when a gesture 508 is sent to the application engine 502 that is badly out of time with the musical underscore as determined by the application engine 502, a predetermined value can be optionally deducted from the score 303, such as 25. Alternatively, additional algorithms that involve other parameters can determine the scoring during free style play.

Multiple players can optionally save their game scores for competitive playing against each other.

FIG. 5 illustrates a diagram of a system 500 for multi-layered media playback in Cyber Reality gaming in accordance with embodiments of the present disclosure.

The system 500 can be implemented in an electronic device 501, and embodied as one of a computer, a smart phone, a tablet, a touchscreen computer, a cyber reality headset 601 (FIG. 6) and the like having display 505.

Application engine 502 is operable on an electronic processor 503 and receives one or more Gestures from the multiple virtual triggers 100 within the cyber reality environment 112, such as shown in FIG. 1, FIG. 2, FIG. 3, FIG. 4, and FIG. 6.

Application engine 502 controls playback of media files 506 that are combined to form a multilayered media file based on one or more of Gesture inputs 508, according to a definition file 511, via sound the engine 504. The media files 506 can be one or more MIDI files, samples such as .wav and .mp3 files, video files in a plurality of formats, and/or any other audio or video file format.

The application offers two user selectable modes of operation: game play 302 and free style 602, as previously described, with each having their own playing methods and scoring algorithms.

In game play mode 302, the virtual trigger activator 509 receives virtual trigger activation cues 510 from the media files 506 that are associated with the content of the musical programs, and controls the active/inactive state of the virtual triggers 100 as shown in FIG. 4. When the virtual triggers 100 are under control of the virtual trigger activator 509, they will only pass gestures 508 to the application engine 502 while they are activated.

In free style mode 602, the virtual trigger activator 509 is bypassed and all virtual triggers 100 are always active.

Gesture inputs 508 include one or more standard gestures that indicate when and how an interactive virtual trigger 100 is being "touched" by the user within the cyber environment 112. Gesture inputs 508 used for triggering may include, but are not limited to, a Tap gesture and a Tap-and-Hold gesture.

With a Tap gesture, the touch is held within the virtual trigger 100 for a substantially short period of time, such as with a threshold for the short period of time of 0.5 seconds or less. The application engine 502 can use the Tap gesture to trigger a one-shot, play a single note in a streamed sequence, or start and stop a loop.

With a Tap-and-Hold gesture, the touch is held within the virtual trigger object 100 a longer period of time, such as with a threshold for the longer period of time of 0.5 seconds or more. Additional thresholds may be used for Tap-and-Hold gesture with each threshold associated with a different action to be taken by the application engine 502.

The Application engine 502 can use a Tap-and-hold gesture to Pulse (stream) notes.

Many additional gestures can trigger the virtual triggers, such as the user using an object, such as a wand, to trigger the virtual triggers 100.

Processor 503 is configured such that visual outputs from the application engine 502 are displayed within the cyber reality environment 112 on display 505 and output from sound engine 504 is played on speaker 512. The combination of application engine 502 and sound engine 504 form an application on the processor 503. The processor 503 is configured to selectively associate the music programs with each of the plurality of virtual triggers 100. The processor 503 is configured such that when one of the virtual triggers 100 is in a first state for a prolonged period of time successive said audible musical sounds are generated, such that, for instance, the musical program associated with the virtual trigger 100 continues to play uninterrupted, along with any other music programs that are playing in response the associated virtual trigger 100 being triggered.

Display 505 displays the total cyber reality environment 112, which includes Foreground and Background visualizations.

When a virtual trigger 100 is virtually touched or triggered by a user Gesture, trigger-specific visual output from application engine 502 can be displayed to simulate triggering a virtual trigger 100 within the cyber reality environment 112.

When a virtual trigger 100 is triggered by a user Gesture, trigger-specific visual output from application engine 502 can be displayed to alter the display properties or attributes of any element within the cyber reality environment 112, such as the virtual triggers 100 in the Foreground or what the user sees in the Background behind the virtual triggers 100.

FIG. 6 shows an embodiment for Free Style mode 602, where the virtual triggers 100 are always enabled and active.

FIG. 6 shows how a user could interact with the cyber environment 112 while in Free Style mode 602, where the virtual triggers 100 are icons that are arranged in front of the user as seen in display 505 of cyber reality headset display 601.

The virtual triggers 100 are not controlled by the virtual trigger activators 300 and are always active and enabled. Every time a user interacts with a virtual trigger 100, the appropriate gesture 508 is sent to the application engine 502 and the assigned media file 506 is played.

In this illustration, the virtual triggers 100 are icons that are floating in front of a kaleidoscope background 102 which is dynamically controlled by the sounds being interactively played.

In both the Game Play mode and the Free Style mode, the generated audio music from triggering the virtual triggers is saved as a separate media file 506, and is available for playback on device 501, and is also transferable to another device for play, such as to a computer and to a portable electronic device, such as a smart phone. The saved generated audio music file 506 is shareable, such as wirelessly by using BlueTooth or via a removable storage device, and is also uploadable to a device, network or the Cloud, such as using WiFi, such as using applications including Facebook, Snap Chat and Twitter etc.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

The invention claimed is:

1. A device configured to enable a user to compose musical sounds, comprising:

an electronic processor configured to generate a control signal as a function of virtual triggers selected by a user;

the electronic processor also configured to generate the control signal as a function of a plurality of music programs, wherein each said music program comprises sound elements and comprising a subset of a musical composition, and the music programs are correlated to each other, the electronic processor configured to generate a score as a function of the user selecting the virtual triggers;

the electronic processor configured to generate an audio signal indicative of audible musical sounds as a function of the control signal, and a cyber reality headset configured to display the virtual triggers and the score.

2. The device as specified in claim 1 wherein the electronic processor is configured to generate the score as a function of the user selecting one of the virtual triggers at an event displayed on the cyber reality headset.

3. The device as specified in claim 2 wherein the event is a timing window of a predetermined length.

4. The device as specified in claim 2 wherein the event comprises the electronic processor visually modifying the virtual trigger to be selected by the user.

5. The device as specified in claim 2 wherein the event comprises a displayed collision of an object with one of the virtual triggers.

6. The device as specified in claim 2 wherein the score is increased when the user selects the virtual trigger during the event.

7. The device as specified in claim 6 wherein the score is decreased when the user does not select the virtual trigger during the event.

8. The device as specified in claim 1 wherein the electronic processor is configured to generate the audio signal indicative of the audible musical sounds in response to the user selecting the virtual trigger.

9. The device as specified in claim 1 wherein the electronic processor is configured to generate a unique said control signal as a function of a type of gesture the user uses to select the virtual trigger.

10. The device as specified in claim 1 wherein each of the music programs is a subset of a song.

11. The device as specified in claim 10 wherein the electronic processor is configured to generate a control signal indicative of a single note in a streamed sequence, or start and stop a loop, in response to a tap gesture.

12. The device as specified in claim 1 wherein when one of the virtual triggers is in a first state for a prolonged period of time, the audio signal is configured to generate successive said audible musical sounds.

13. The device as specified in claim 1 wherein the electronic processor is configured to associate each of the selected virtual triggers with one or more of the plurality of music programs.

14. The device as specified in claim 1 wherein the electronic processor is configured to communicate with an application engine, a definition file, and a plurality of media files including the music programs.

15. The device as specified in claim 1 wherein each of the virtual triggers is associated with a unique musical instrument.

16. The device as specified in claim 15 wherein each of the virtual triggers is depicted by the virtual reality headset as an image indicative of the associated musical instrument.

17. The device as specified in claim 1 wherein at least one icon is displayed as a function of the user selecting one of the virtual triggers.

18. The device as specified in claim 1 wherein the cyber reality headset is configured to display a foreground environment and a background environment, where the virtual triggers appear in the foreground environment on top of the background environment.

19. The device as specified in claim 18 wherein the background environment is altered when at least one of the virtual triggers is selected by the user.

20. The device as specified in claim 18 wherein the background environment is dynamically linked to the music programs that are triggered by the user.

* * * * *